US012073759B2

United States Patent

Hong et al.

(10) Patent No.: US 12,073,759 B2

(45) Date of Patent: Aug. 27, 2024

(54) DISPLAY DEVICE

(71) Applicant: LG DISPLAY CO., LTD., Seoul (KR)

(72) Inventors: MooKyoung Hong, Gyeonggi-do (KR); SinKyun Park, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/963,352

(22) Filed: Oct. 11, 2022

(65) Prior Publication Data

US 2023/0136391 A1 May 4, 2023

(30) Foreign Application Priority Data

Nov. 3, 2021 (KR) ........................ 10-2021-0150126

(51) Int. Cl.

*G09G 3/20* (2006.01)
*G09G 3/32* (2016.01)

(Continued)

(52) U.S. Cl.

CPC ......... *G09G 3/2074* (2013.01); *G09G 3/3225* (2013.01); *G09G 3/32* (2013.01); *G09G 3/3291* (2013.01); *G09G 2300/0413* (2013.01); *G09G 2300/0819* (2013.01); *G09G 2300/0842* (2013.01); *G09G 2310/0251* (2013.01); *G09G 2310/061* (2013.01); *G09G 2310/08* (2013.01); *G09G 2320/02* (2013.01); *G09G 2320/0238* (2013.01); *G09G 2320/0247* (2013.01); *G09G 2320/029* (2013.01);

(Continued)

(58) Field of Classification Search

CPC ...... G09G 3/2074; G09G 3/3225; G09G 3/32; G09G 2300/0413; G09G 2300/0819; G09G 2300/0842; G09G 2310/08; G09G 2320/0238; G09G 2320/0247; G09G 2340/0435; G09G 2310/0251; G09G 2320/0271; G09G 2320/029; G09G 2320/043; G09G 2320/046; G09G 3/3233; G09G 2320/0251; G09G 2310/02; H10K 59/12

See application file for complete search history.

(56) References Cited

U.S. PATENT DOCUMENTS 9,823,729 B2 * 11/2017 An ........................ G09G 3/3233
2017/0061875 A1 3/2017 Cho et al.

(Continued)

FOREIGN PATENT DOCUMENTS

EP 3975164 A1 3/2022

OTHER PUBLICATIONS

Extended European Search Report, dated May 4, 2023 issued in Patent Application No. 22201906.9 (13 pages).

*Primary Examiner* — Douglas M Wilson

(74) *Attorney, Agent, or Firm* — POLSINELLI PC

(57) ABSTRACT

A display device includes a sub-pixel comprising a light emitting device and a driving transistor DRT electrically connected to a first electrode of the light emitting device and configured to drive the light emitting device, and a reference voltage line electrically connected to the sub-pixel SP and applying an initialization voltage to the first electrode of the light emitting device, wherein a voltage level of the initialization voltage is changed according to a length of a blank period, thereby improving display quality of the image at a low refresh rate in a variable refresh rate mode.

14 Claims, 17 Drawing Sheets

(51) Int. Cl.

| | |
|---|---|
| ***G09G 3/3225*** | (2016.01) |
| ***G09G 3/3291*** | (2016.01) |
| ***H10K 59/12*** | (2023.01) |

(52) U.S. Cl.
CPC ............... *G09G 2320/0295* (2013.01); *G09G 2330/028* (2013.01); *G09G 2340/0435* (2013.01)

(56) References Cited

U.S. PATENT DOCUMENTS

| | | | | |
|---|---|---|---|---|
| 2018/0074569 | A1* | 3/2018 | An | G06F 1/3265 |
| 2020/0175919 | A1* | 6/2020 | Hong | G09G 3/3233 |
| 2020/0226978 | A1* | 7/2020 | Lin | H01L 29/7869 |
| 2020/0372861 | A1* | 11/2020 | Ok | G09G 3/3233 |
| 2021/0056895 | A1 | 2/2021 | Lee et al. | |
| 2022/0084472 | A1* | 3/2022 | Kim | G09G 3/3266 |
| 2022/0122550 | A1* | 4/2022 | Ha | G09G 3/3291 |
| 2022/0199025 | A1 | 6/2022 | Hong et al. | |
| 2022/0366847 | A1* | 11/2022 | An | G09G 3/2003 |

* cited by examiner

| | | |
|---|---|---|
| Receiving general image data | Performing image correction algorithm (Logo Area Luminance Lowering, etc.) | Displaying image at preset refresh rate |
| Receiving 1st gaming image data | Bypass | Driving in fixed refresh rate mode (Mode 1) |
| Receiving 2nd gaming image data | Bypass | Driving in variable refresh rate mode (Mode 2) |

DISPLAY DEVICE

CROSS-REFERENCE TO RELATED APPLICATION

This application claims the priority of Korean Patent Application No. 10-2021-0150126, filed on Nov. 3, 2021, which is hereby incorporated by reference in its entirety.

BACKGROUND

Field of the Disclosure

The present disclosure relates to a display device.

Description of the Background

As the information society develops, there is increasing the demand for a display device for displaying an image in various forms, and various display devices such as a liquid crystal display device and an organic light emitting display device are utilized.

A display device is used for displaying images of various contents. For example, a display device may display images of various contents such as broadcasting, movies, and games.

Meanwhile, unlike broadcasting and movies, users who watch game images may have a characteristic that they want the frame to be changed quickly. Accordingly, some display devices need to be designed to support a variable refresh rate ("VRR") mode capable of being driven from a low refresh rate to a high refresh rate.

SUMMARY

Accordingly, the present disclosure is to provide a display device with improved image display quality in a variable refresh rate mode.

The present disclosure is also to provide a display device having improved expressive power of low grayscale images at low refresh rate.

In an aspect of the present disclosure, a display device includes a sub-pixel comprising a light emitting device and a driving transistor electrically connected to a first electrode of the light emitting device and configured to drive the light emitting device, and a reference voltage line electrically connected to the sub-pixel and applying an initialization voltage to the first electrode of the light emitting device, wherein a voltage level of the initialization voltage is changed according to a length of a blank period.

According to various aspects of the present disclosure, a display device can be provided with improved image display quality in variable refresh rate mode.

According to various aspects of the present disclosure, a display device can be provided with improved expressive power of low grayscale images at low refresh rate.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings:

FIG. 5 is a diagram for explaining driving of a display panel when a vertical synchronization ("VSYNC") mode is turned on;

FIG. 6 is a diagram for explaining an example in which a frame lag occurs when the VSYNC mode is turned on;

DETAILED DESCRIPTION

Figure 1:
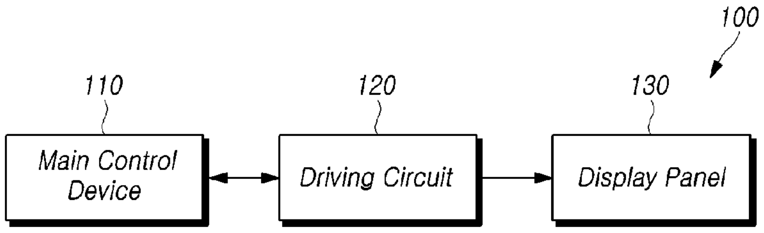
FIG. 1 is a schematic configuration block diagram of a display device according to the present disclosure.

In the following description of examples or aspects of the present disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various aspects of the present disclosure will be described in detail with reference to the accompanying drawings.

FIG. 1 is a schematic configuration block diagram of a display device 100 according to the present disclosure.

Referring to FIG. 1, a display device 100 according to the present disclosure may include a main control device 110 for controlling an operation of the display device 100 according to an external input, and a display panel 130 for displaying image data provided from the main control device 110, and a driving circuit 120 for driving the display panel 130. The main control device 110 may be also referred to as a system on chip (SoC) device.

In the display device 100 according to the present disclosure, the main control device 110 may include a system memory, a central processing unit (CPU), an interrupt controller, and a transceiver (Tx/Rx), a memory controller, an image generator, and a display controller.

A system memory in the main control device 110 may store commands, parameters, and so on required for the operation of the driving circuit 120. For example, the CPU may operate using commands and parameters stored in the system memory.

The CPU in the main control device 110 may control the operation of the main control device 110 as a whole. For example, the CPU may control operations of the system memory, the interrupt controller, the transceiver, the memory controller, the image generator, and the display controller. In addition, the CPU may request the image generator to generate or process an image.

The interrupt controller in the main control device 110 may control the overall operation of the main control device 110. That is, the interrupt controller may receive interrupts from each component, adjust the execution order of each interrupt, and transmit information to the CPU to perform an operation corresponding to the interrupt.

The transceiver in the main control device 110 may transmit/receive commands, signals, interrupts, and data converted according to various interface standards to and from the driving circuit 120. The transceiver in the main control device 110 may provide the image data stored in the external memory to a source driver integrated circuit through a timing controller of the driving circuit 120.

The memory controller in the main control device 110 may control the external memory when transmitting and receiving data from the external memory connected to the main control device 110. That is, the memory controller may read, write, and delete image data by accessing the external memory according to a request of the CPU, the image generator, or the display controller.

The image generator in the main control device 110 may read and execute program commands related to graphic processing under the control of the CPU, and may generate or process an image. Such an image generator may be implemented as a graphic engine, a graphic processing unit (GPU), a graphic accelerator, 2D, or the like.

The display controller in the main control device 110 may control the operation of the main control device 110 with respect to the driving circuit 120 or control the operation of the driving circuit 120 with respect to the main control device 110. For example, the display controller may control the memory controller to output data stored in the external memory through the transceiver. In addition, the display controller may control the image generator so that the image data generated by the image generator is output through the transceiver.

A system bus in the main control device 110 may serve as a path for data transmission/reception between each component by connecting each component of the main control device 110. The system bus may include a small bus for data communication between components.

The main control device 110 may be referred as an integrated circuit (IC), a processor, an application processor, a multimedia processor, or an integrated multimedia processor, etc.

Figure 2:
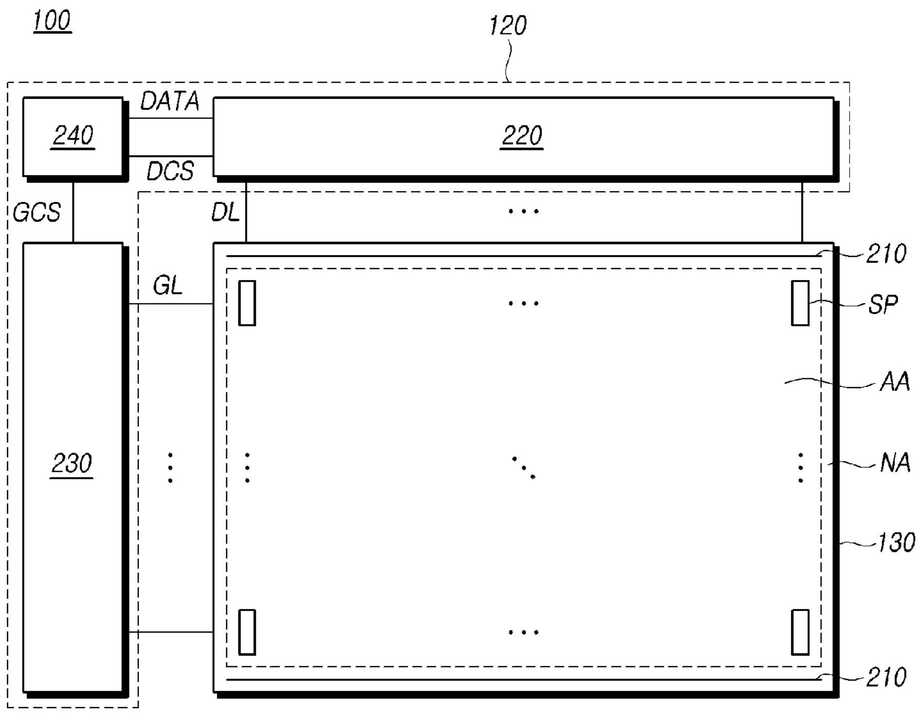
FIG. 2 is a diagram for explaining a display device according to the present disclosure.

FIG. 2 is a diagram for explaining a display device 100 according to the present disclosure.

Referring to FIG. 2, the display device according to the present disclosure may include a display panel 130 and a driving circuit 120 for driving the display panel 130.

Signal lines such as a plurality of data lines DL and a plurality of gate lines GL may be disposed on the display panel 130 on a substrate. A plurality of sub-pixels SP electrically connected to a plurality of data lines DL and a plurality of gate lines GL may be disposed on the display panel 130.

The display panel 130 may include a display area AA in which an image is displayed and a non-display area NA in which an image is not displayed. In the display panel 130, a plurality of sub-pixels SP for displaying an image are disposed in the display area AA, and the data driving circuit 220 and the gate driving circuit 230 are mounted in the non-display area NA. Alternatively, a pad portion connected to a data driving circuit 220 or a gate driving circuit 230 may be disposed.

One or more monitoring sub-pixels, which do not display an image, may be positioned in the non-display area NA of the display panel 130.

In the case that two or more dummy sub-pixels are positioned on the display panel 130, the two or more monitoring sub-pixels may be positioned on a dummy line 210.

The monitoring sub-pixel may receive a data signal from the data line DL and may receive a gate signal from the gate line GL.

The monitoring sub-pixel may not include a light emitting device. Therefore, the monitoring subpixel does not emit light.

The monitoring sub-pixel may be located outside the display area AA. For example, the monitoring sub-pixel may be located on the upper side adjacent to the data driving circuit 220 in the display panel 130 and/or on the lower side most distant from the data driving circuit 220 in the display panel 130.

The dummy line 210 may be disposed in a direction parallel to the plurality of gate lines GL in the display panel 130.

The data driving circuit 220 is a circuit configured to drive the plurality of data lines DL, and may supply data signals to the plurality of data lines DL. The gate driving circuit 230 is a circuit configured to drive the plurality of gate lines GL, and may supply gate signals to the plurality of gate lines GL. A timing controller 240 may supply a data driving timing control signal DCS to the data driving circuit 220 to control the operation timing of the data driving circuit 220. The timing controller 240 may supply a gate driving timing control signal GCS for controlling the operation timing of the gate driving circuit 230 to the gate driving circuit 230.

The timing controller 240 may start a scan according to the timing implemented in each frame, and convert the input image data input from the outside according to the data signal format used by the data driving circuit 220, supply the converted image data DATA to the data driving circuit 220, and control the data driving at an appropriate time according to the scan.

The timing controller 240 may receive, together with the input image data, various timing signals including a vertical synchronization signal Vsync, a horizontal synchronization signal Hsync, an input image data enable signal DE, and a clock signal CLK from the outside (e.g., the main control device 110 of FIG. 1).

The timing controller 240 may, in order to control the data driving circuit 220 and the gate driving circuit 230, receive the vertical synchronization signal Vsync, the horizontal synchronization signal Hsync, the input data enable signal DE, and the clock signal CLK, etc., and may generates various control signals (e.g., DCS, GCS, etc.) to output to the data driving circuit 220 and the gate driving circuit 230.

The timing controller 240 may output various gate driving timing control signals GCS including a gate start pulse GSP, a gate shift clock GSC, a gate output enable signal GOE and the like in order to control the gate driving circuit 230.

The timing controller 240 may output various data driving timing control signals DCS including a source start pulse SSP, a source sampling clock SSC, and the like in order to control the data driving circuit 220.

The data driving circuit 220 receives the image data DATA from the timing controller 240 and drives the plurality of data lines DL.

The data driving circuit 220 may include one or more source driver integrated circuits SDICs.

Each source driver integrated circuit SDIC may be connected to the display panel 130 by a tape automated bonding (TAB) method, or may be connected to the bonding pad of the display panel 130 in a chip-on-glass (COG) method, or may be implemented in a chip-on-film (COF) method to be electrically connected to the display panel 130.

The gate driving circuit 230 may output a gate signal having a turn-on level voltage or a gate signal having a turn-off level voltage under the control of the timing controller 240. The gate driving circuit 230 may drive the plurality of gate lines GL by supplying a gate signal having a turn-on level voltage to the plurality of gate lines GL.

The gate driving circuit 230 may be connected to the display panel 130 by a tape automatic bonding (TAB) method, or may be connected to the bonding pad of the display panel 130 by a chip-on-glass (COG) method or a chip-on-panel (COP) method, or may be electrically connected to the display panel 130 according to a chip-on-film (COF) method.

The gate driving circuit 230 may be formed in the non-display area NA of the display panel 130 as a gate-in-panel (GIP) type. The gate driving circuit 230 may be disposed on or connected to the substrate of the display panel 130. In the case of the gate-in-panel (GIP) type, the gate driving circuit 230 may be disposed in the non-display area NA of the substrate. The gate driving circuit 230 may be connected to the substrate of the display panel 130 in the case of a chip-on-glass (COG) method or a chip-on-film (COF) method.

If a specific gate line GL is opened by the gate driving circuit 230, the data driving circuit 120 may convert the image data DATA received from the timing controller 240 into an analog data voltage to supply to the plurality of data lines DL.

The data driving circuit 220 may be connected to one side (e.g., an upper side or a lower side) of the display panel 130. Depending on the driving method, the panel design method, etc., the data driving circuit 220 may be connected to both sides (e.g., upper side and lower side) of the display panel 130, or may be connected to two or more of the four sides of the display panel 130.

The gate driving circuit 230 may be connected to one side (e.g., left side or right side) of the display panel 130. Depending on the driving method, the panel design method, etc., the gate driving circuit 230 may be connected to both sides (e.g., left side and right side) of the display panel 130, or may be connected to two or more of the four sides of the display panel 130.

The timing controller 240 may be a timing controller used in a conventional display technology, or may be a control device capable of further performing other control functions including the timing controller, or may be a circuit within the control device. The timing controller 240 may be implemented with various circuits or electronic components, such as an integrated circuit (IC), a field programmable gate array (FPGA), an application specific integrated circuit (ASIC), or a processor.

The timing controller 240 may be mounted on a printed circuit board (PCB), a flexible printed circuit board (FPCB), etc., and may be electrically connected to the data driving circuit 220 and the gate driving circuit 230 through a printed circuit board (PCB), a flexible printed circuit board (FPCB), or the like.

The timing controller 240 may transmit/receive signals to and from the data driving circuit 220 according to one or more predetermined interfaces. Here, for example, the interface may include a low voltage differential signaling (LVDS) interface, an EPI interface, and a serial peripheral interface (SPI).

The timing controller 240 may include a storage medium such as one or more registers.

The display device 100 according to the aspects of the present disclosure may be a display device including a liquid crystal display (LCD) device with a backlight unit, or may be a self-luminous display device such as an organic light emitting diode (OLED) display, a quantum dot display, and a micro light emitting diode (micro LED) display.

In the case that the display device 100 according to the aspects of the present disclosure is an OLED display, each sub-pixel SP may include an organic light emitting diode (OLED) emitting light as a light emitting device. If the display device 100 according to aspects of the present disclosure is a quantum dot display, each sub-pixel SP may include a light emitting device made of quantum dots, which are semiconductor crystals that emit light by themselves. In the case that the display device according to aspects of the present disclosure is a micro LED display, each sub-pixel SP may include the micro LED as a light emitting device, which emits light by itself and is made from inorganic materials.

Figure 3:
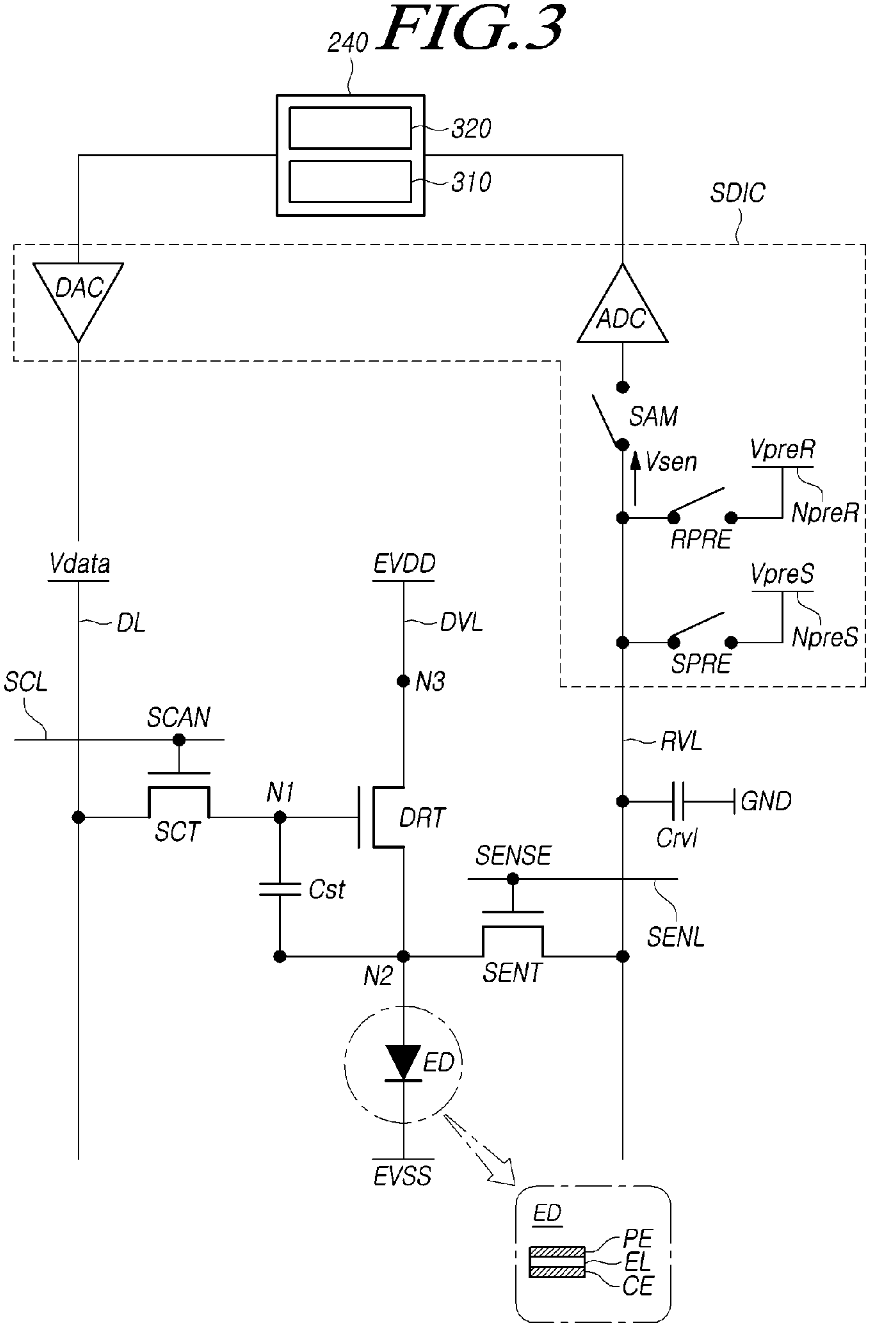
FIG. 3 schematically illustrates a sub-pixel structure of a display device according to the present disclosure and a configuration for compensating for characteristic values of sub-pixels.

FIG. 3 is a diagram briefly illustrating a structure of a sub-pixel SP of a display device and a configuration for compensating for characteristic values of the sub-pixel SP according to aspects of the present disclosure.

Referring to FIG. 3, each of the plurality of sub-pixels SP may include a light emitting device ED, a driving transistor DRT, a scan transistor SCT, and a storage capacitor Cst.

The light emitting device ED may include a first electrode and a second electrode and a light emitting layer EL positioned between the first electrode and the second electrode.

The first electrode of the light emitting device ED is a pixel electrode PE, and the second electrode of the light emitting device ED is a common electrode CE.

The pixel electrode PE of the light emitting device ED may be an electrode disposed in each sub-pixel SP, and the common electrode CE may be an electrode commonly disposed in all sub-pixels SP. Here, the pixel electrode PE may be an anode electrode and the common electrode CE may be a cathode electrode. Alternatively, the pixel electrode PE may be a cathode electrode and the common electrode CE may be an anode electrode.

For example, the light emitting device ED may be an organic light emitting diode OLED, a light emitting diode LED, or a quantum dot light emitting device.

The driving transistor DRT is a transistor for driving the light emitting device ED, and may include a first node N1, a second node N2, a third node N3, and the like.

The first node N1 of the driving transistor DRT may be a gate node of the driving transistor DRT, and may be electrically connected to a source node or a drain node of the scan transistor SCT. The second node N2 of the driving transistor DRT may be a source node or a drain node of the driving transistor DRT, and may be electrically connected to a source node or a drain node of the sensing transistor SENT and the light emitting device ED and may also be electrically connected to the pixel electrode PE of the light emitting device ED. The third node N3 of the driving transistor DRT may be electrically connected to a driving voltage line DVL supplying a high potential driving voltage EVDD.

The scan transistor SCT may be controlled by a scan pulse SCAN, which is a type of gate signal, and may switch an electrical connection between the first node N1 of the driving transistor DRT and the data line DL. That is, the scan transistor SCT may be turned on or turned off according to the scan pulse SCAN supplied from the scan line SCL, which is a type of the gate line GL, and may control an electrical connection between the data line DL and the first node N1 of the driving transistor DRT.

The scan transistor SCT may be turned on by the scan pulse SCAN having a turn-on level voltage, and may transfer the data voltage Vdata supplied from the data line DL to the first node N1 of the driving transistor DRT.

Here, in the case that the scan transistor SCT is an n-type transistor, the turn-on level voltage of the scan pulse SCAN may be a high level voltage. If the scan transistor SCT is a p-type transistor, the turn-on level voltage of the scan pulse SCAN may be a low level voltage.

The storage capacitor Cst may be electrically connected to the first node N1 and the second node N2 of the driving transistor DRT. The storage capacitor Cst is charged with an amount of charge corresponding to the voltage difference between both ends, and serves to maintain the voltage difference between both ends for a predetermined frame time. Accordingly, during a predetermined frame time, the corresponding sub-pixel SP may emit light.

Referring to FIG. 3, each of the plurality of sub-pixels SP disposed on the display panel 130 of the display device 100 according to aspects of the present disclosure may further include a sensing transistor SENT.

The sensing transistor SENT may be controlled by a sense pulse SENSE, which is a type of gate signal, and may be electrically connected to the second node N2 of the driving transistor DRT and a reference voltage line RVL. That is, the sensing transistor SENT is turned on or turned off according to the sense pulse SENSE supplied from a sense line SENL, which is another type of the gate line GL, and may switch an electrical connection between the reference voltage line RVL and the second node N2 of the driving transistor DRT.

The second node N2 of the driving transistor DRT is also referred to as a sensing node.

The sensing transistor SENT may be turned on by a sense pulse SENSE having a turn-on level voltage, and may transfer an initialization voltages VpreR, VpreS, etc. supplied from the reference voltage line RVL to the second node N2 of the driving transistor DRT. The reference voltage line RVL is also referred to as a sensing line.

A first initialization switch RPRE may switch an electrical connection between the reference voltage line RVL and the an initialization voltage supply node NpreR. The first initialization switch RPRE includes one end electrically connected to the reference voltage line RVL and the other end electrically connected to the first initialization voltage supply node NpreR.

A first initialization voltage VpreR is applied to the first initialization voltage supply node NpreR.

A second initialization switch SPRE may switch an electrical connection between the reference voltage line RVL and a second initialization voltage supply node NpreS. The second initialization switch SPRE includes one end electrically connected to the reference voltage line RVL and the other end electrically connected to the second initialization voltage supply node NpreS.

The second initialization voltage VpreS is applied to the second initialization voltage supply node NpreS. A voltage level of the second initialization voltage VpreS may be different from a voltage level of the first initialization voltage VpreR.

The first initialization voltage VpreR may be a voltage input used to initialize the voltage of the second node N2 of the driving transistor DRT when the data voltage Vdata for image display is input to the data line DL. For example, the data voltage Vdata for image display is supplied to the first node N1 of the driving transistor DRT, and the first initialization voltage VpreR is supplied to the second node N2 of the driving transistor DRT, so that there may be generated a potential difference at both ends of the storage capacitor Cst.

The second initialization voltage VpreS may be a voltage input to initialize the voltage of the second node N2 of the driving transistor DRT when a voltage for sensing the characteristic value of the sub-pixel SP is input to the data line DL. For example, the voltage Vdata for sensing the characteristic value of the sub-pixel SP is supplied to the first node N1 of the driving transistor DRT, and the second initialization voltage VpreS may be supplied to the second node N2 of the driving transistor DRT, so that a potential difference may be generated between both ends of the storage capacitor Cst.

As described above, the reference voltage line RVL may apply the first initialization voltage VpreR or the second initialization voltage VpreS to the sub-pixel SP. Similarly, the voltage source supplying the first initialization voltage VpreR may apply the first initialization voltage VpreR to the sub-pixel SP. The voltage source supplying the second initialization voltage VpreS may apply the second initialization voltage VpreS to the sub-pixel SP. The voltage source for applying the first initialization voltage VpreR and/or the second initialization voltage VpreS to the sub-pixel SP may be, for example, a power management circuit.

The sensing transistor SENT may be turned on by a sense pulse SENSE having a turn-on level voltage, and transfer the voltage of the second node N2 of the driving transistor DRT to the reference voltage line RVL.

Here, if the sensing transistor SENT is an n-type transistor, the turn-on level voltage of the sense pulse SENSE may be a high level voltage. If the sensing transistor SENT is a p-type transistor, the turn-on level voltage of the sense pulse SENSE may be a low level voltage.

A function of the sensing transistor SENT for transferring the voltage of the second node N2 of the driving transistor DRT to the reference voltage line RVL may be used when driving to sense the characteristic value of the sub-pixel SP. In this case, the voltage transferred to the reference voltage line RVL may be a voltage for calculating the characteristic value of the sub-pixel SP or a voltage in which the characteristic value of the sub-pixel SP is reflected.

Each of the driving transistor DRT, the scan transistor SCT, and the sensing transistor SENT may be an n-type transistor or a p-type transistor. In aspects of the present disclosure, for convenience of description, each of the driving transistor DRT, the scan transistor SCT, and the sensing transistor SENT is an n-type as an example.

The storage capacitor Cst may not be a parasitic capacitor (e.g., Cgs, Cgd) which is an internal capacitor between the gate node and the source node (or drain node) of the driving transistor DRT, but may be an external capacitor intentionally designed outside the driving transistor DRT.

The scan line SCL and the sense line SENL may be different gate lines GL. In this case, the scan pulse SCAN and the sense pulse SENSE may be separate gate signals, and the on-off timing of the scan transistor SCT and the on-off timing of the sensing transistor SENT in one sub-pixel SP may be independent. That is, the on-off timing of the scan transistor SCT and the on-off timing of the sensing transistor SENT in one sub-pixel SP may be the same or different.

Alternatively, the scan line SCL and the sense line SENL may be the same gate line GL. That is, the gate node of the scan transistor SCT and the gate node of the sensing transistor SENT in one sub-pixel SP may be connected to one gate line GL. In this case, the scan pulse SCAN and the sense pulse SENSE may be the same gate signal, and the on-off timing of the scan transistor SCT and the on-off timing of the sensing transistor SENT in one sub-pixel SP may be the same.

The structure of the sub-pixel SP shown in FIG. 3 is merely an example, and may be variously modified by further including one or more transistors or further including one or more capacitors.

In addition, in FIG. 3, the sub-pixel SP structure is described assuming that the display device 100 is a self-luminous display device. However, in the case that the display device 100 is a liquid crystal display device, each sub-pixel SP may include a transistor and a pixel electrode.

Referring to FIG. 3, the display device 100 according to the present disclosure may include a line capacitor Crv1. The line capacitor Crv1 may be a capacitor element having one end electrically connected to the reference voltage line RVL or a parasitic capacitor formed on the reference voltage line RVL.

Referring to FIG. 3, the source driver integrated circuit SDIC may further include an analog-to-digital converter ADC and a sampling switch SAM.

The reference voltage line RVL may be electrically connected to the analog-to-digital converter ADC. The analog-to-digital converter ADC may sense the voltage of the reference voltage line RVL. The voltage sensed by the analog-to-digital converter ADC may be a voltage in which the characteristic value of the sub-pixel SP is reflected.

In the present disclosure, the characteristic value of the sub-pixel SP may be the characteristic value of the driving transistor DRT or the light emitting device ED. The characteristic value of the driving transistor DRT may include a threshold voltage and mobility of the driving transistor DRT. The characteristic value of the light emitting device ED may include a threshold voltage of the light emitting device ED.

The analog-to-digital converter ADC may receive an analog voltage, convert the analog voltage into a digital value, and output the digital value to the timing controller 240.

The sampling switch SAM may be located between the analog-to-digital converter ADC and the reference voltage line RVL. The sampling switch SAM may switch an electrical connection between the reference voltage line RVL and the analog-to-digital converter ADC.

The timing controller 240 may include a memory 310 storing characteristic value information of the sub-pixel SP, and a compensation circuit 320 for performing a calculation for compensating for a change in the characteristic value of the sub-pixel SP based on information stored in the memory 310.

Information for compensating for the characteristic value of the sub-pixel SP may be stored in the memory 310. For example, in the memory 310, there may be stored information on the threshold voltage and mobility of the driving transistor DRT of each of the plurality of sub-pixels SP and the threshold voltage of the light emitting device ED included in the sub-pixels SP.

Information on the threshold voltage of the light emitting device ED may be stored in a lookup table LUT of the memory 310.

The compensation circuit 320 may calculate the degree of change in the characteristic value of the sub-pixel SP based on the digital value input from the analog-to-digital converter ADC and the characteristic value information of the sub-pixel SP stored in the memory 310. The compensation circuit 320 may update the characteristic value of the sub-pixel SP stored in the memory 310.

The timing controller 240 may drive the data driving circuit 220 by reflecting the change in the characteristic value of the sub-pixel SP calculated by the compensation circuit 320 and compensating for the image data.

The data signal Vdata in which the characteristic value change of the sub-pixel SP is reflected may be output to the corresponding data line DL through a digital-to-analog converter DAC.

The above process of sensing and compensating for a change in the characteristic value of the sub-pixel SP is also referred to as a "sub-pixel characteristic value compensation process".

Figure 4:
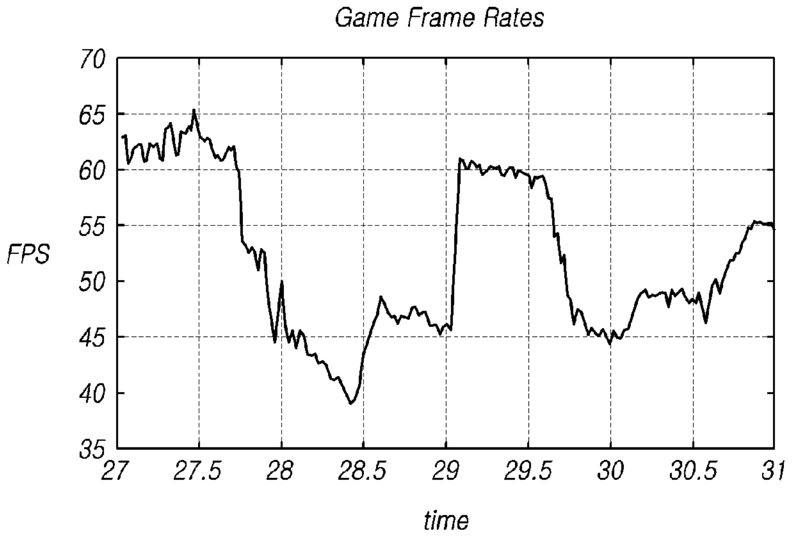
FIG. 4 exemplarily illustrates that a frame rate varies with time in a specific mode.

FIG. 4 exemplarily illustrates that a frame rate varies with time in a specific mode.

Referring to FIG. 4, in a specific mode, a frame rate may vary according to time. The specific mode may be, for example, a gaming mode for displaying game image or a gaming image.

Frame rate, also referred as frames per second (FPS), may be defined as the number of frames displayed in 1 second on a display device.

When a general broadcast image is received and displayed on the display panel, the frame rate may be constant at 24 fps, 30 fps, or the like. However, in the case of a gaming mode, the frame rate may vary over time according to the movement of the user within the game.

Referring to FIG. 4, the frame rate may be higher or lower than 60 fps according to time.

Figure 5:
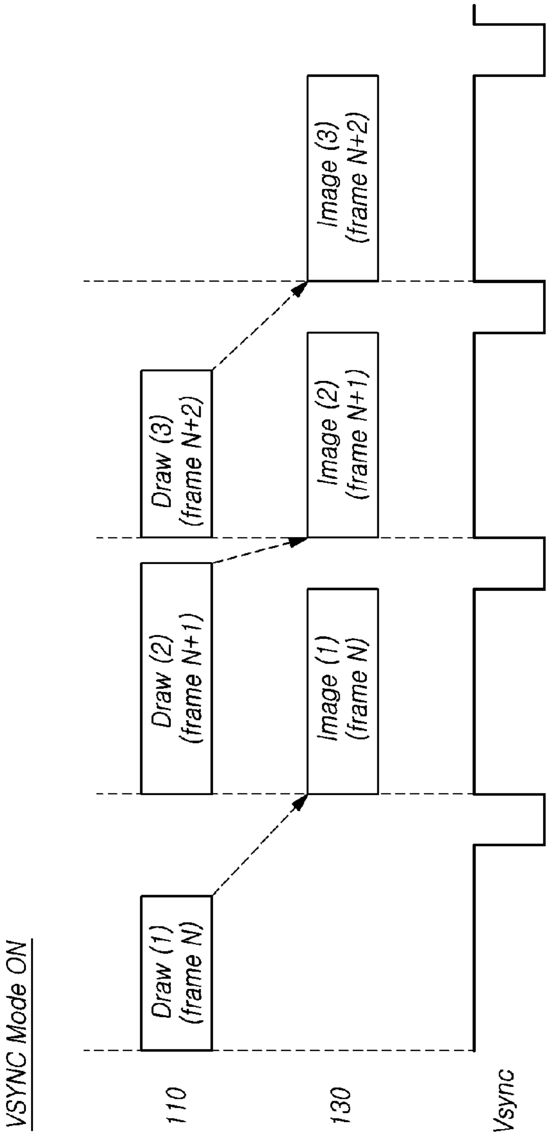

FIG. 5 is a diagram for explaining driving of a display panel when a vertical synchronization mode (VSYNC Mode) is turned on.

The vertical synchronization mode (VSYNC Mode) may mean a mode in which the timing at which the main control device 110 starts to generate the image of the next frame and the timing at which the image of the corresponding frame is output by the display panel 130 are synchronized.

Referring to FIG. 5, the display panel 130 may be driven while the vertical synchronization mode (VSYNC Mode) is turned on.

In a state in which the vertical synchronization mode (VSYNC Mode) is turned on, the display panel 130 displays an image according to the timing of the vertical synchronization signal Vsync. For example, the vertical synchronization signal Vsync may have a first voltage level (e.g., high level) application period having a preset length and a second voltage level (e.g., low level) application period having a preset length.

For example, a period in which the vertical synchronization signal Vsync is applied at the first voltage level may correspond to an active period in which a data voltage for displaying an image is applied to the display panel 130. A period in which the vertical synchronization signal Vsync is applied at the second voltage level may correspond to a blank period between active periods.

Referring to FIG. 5, in a state in which the vertical synchronization mode is turned on, the display panel 130 may display the image of the corresponding frame according to the timing at which the vertical synchronization signal Vsync is switched from the second voltage level to the first voltage level.

The image processed by the main control device 110 is displayed on the display panel 130, and the display panel 130 displays the image according to the timing of the vertical synchronization signal Vsync.

In the state in which the vertical synchronization mode is turned on, even when the processing of the next frame image in the main control device 110 is completed while the signal level of the vertical synchronization signal Vsync is at a high level, an image of a corresponding frame is displayed on the display panel 130, but an image of a next frame is not displayed on the display panel 130.

In a state in which the vertical synchronization mode is turned on, even if the image processing speed of the main control device 110 is fast, the timing of starting the processing the image by the main control device 110 cannot be faster. Accordingly, in a state in which the vertical synchronization mode is turned on, the length of the blank period may be the same for each frame.

Referring to FIG. 5, the main control device 110 processes the image of the N-th frame (Frame N) while the signal level of the vertical synchronization signal Vsync is at a high level. Then, the display panel 130 starts processing the image of the (N+1)-th frame (Frame N+1) in accordance with the timing of displaying the image of the N-th frame (Frame N).

Figure 6:
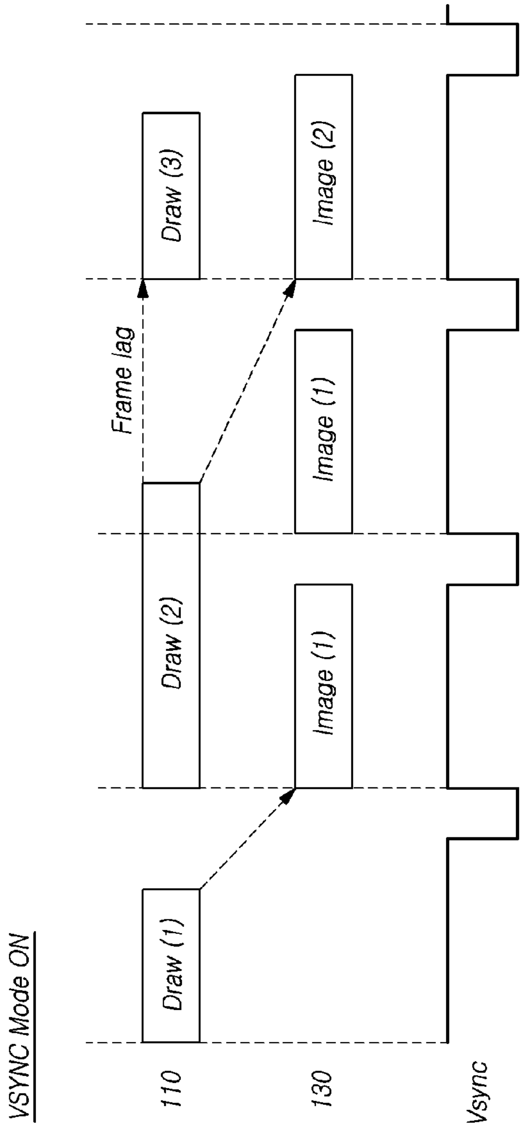

FIG. 6 is a diagram for explaining an example in which a frame lag occurs when the vertical synchronization mode is turned on.

Referring to FIG. 6, if the image processing speed of the main control device 110 is slow while the vertical synchronization mode is turned on, the display panel 130 displays the image of the previous frame as it is, even if the frame is changed.

Accordingly, although the frame is switched by the vertical synchronization signal Vsync, there may be occurred a frame lag phenomenon in which the same image is displayed in the display panel 130.

That is, if the image processing speed of the main control device 110 is slow while the vertical synchronization mode is turned on, a frame lag may occur, and, accordingly, the timing at which the main control device 110 processes the image of the next frame is also delayed.

This frame lag may be particularly problematic in a gaming mode environment which requires a fast response according to frame switching.

Figure 7:
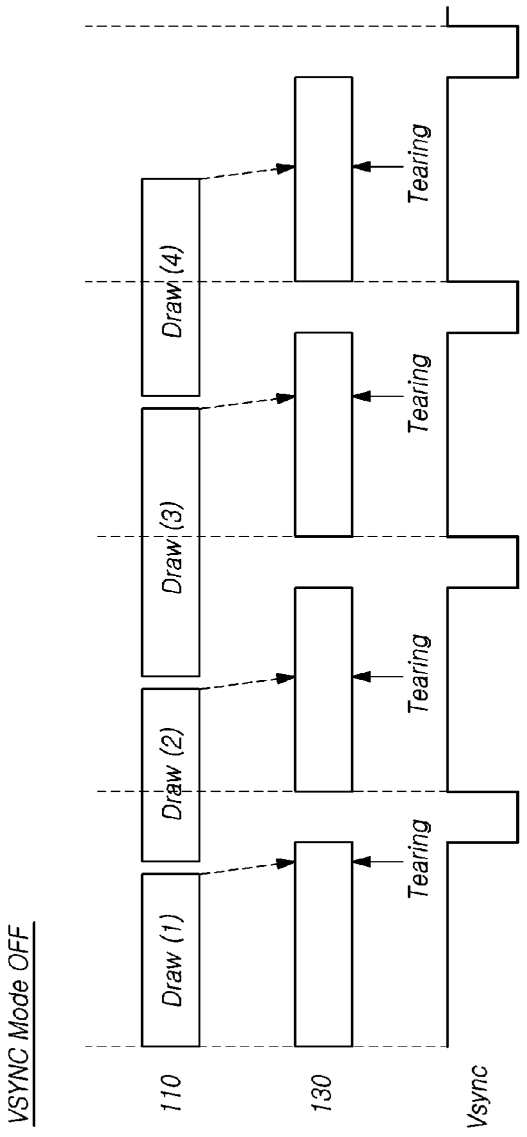
FIG. 7 is a diagram for explaining that a screen tearing phenomenon occurs when the VSYNC mode is turned off.

FIG. 7 is a diagram for explaining that a screen tearing phenomenon occurs when the vertical synchronization mode is turned off.

Referring to FIG. 7, when the vertical synchronization mode is turned off, the main control device 110, regardless of the signal level of the vertical synchronization signal, may start the image processing of the next frame when the image processing of the corresponding frame is completed.

Accordingly, if the image processing speed of the main control device 110 is fast, the time at which the main control device 110 starts processing the image may be faster than that in the mode in which the vertical synchronization mode is turned on.

Meanwhile, when the image processing of the corresponding frame is completed in the main control device 110, the main control device 110 controls the driving circuit to display the processed image on the display panel 130.

Accordingly, the image of the previous frame and the image of the corresponding frame may be displayed on one screen on the display panel 130.

This phenomenon may be called screen tearing.

If the vertical synchronization mode is turned off, a screen tearing phenomenon may be recognized on the display panel 130.

Figure 8:
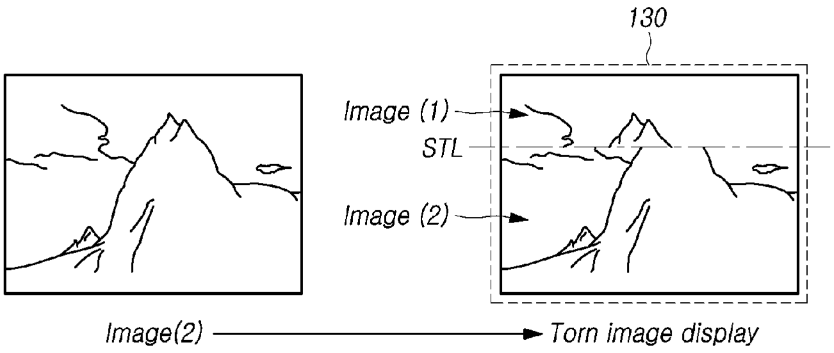
FIG. 8 is a diagram for explaining a screen tearing phenomenon.

FIG. 8 is a diagram for explaining a screen tearing phenomenon.

Referring to FIG. 8, on the display panel 130, an image Image (1) of the previous frame and an image Image (2) of the corresponding frame may displayed on one screen with respect to a screen tearing line STL.

If screen tearing occurs, the image Image(1) of the previous frame and the image Image(2) of the corresponding frame are displayed on the display panel 130 on one screen, so that the display panel 130 displays a screen as if the image was torn.

Figure 9:
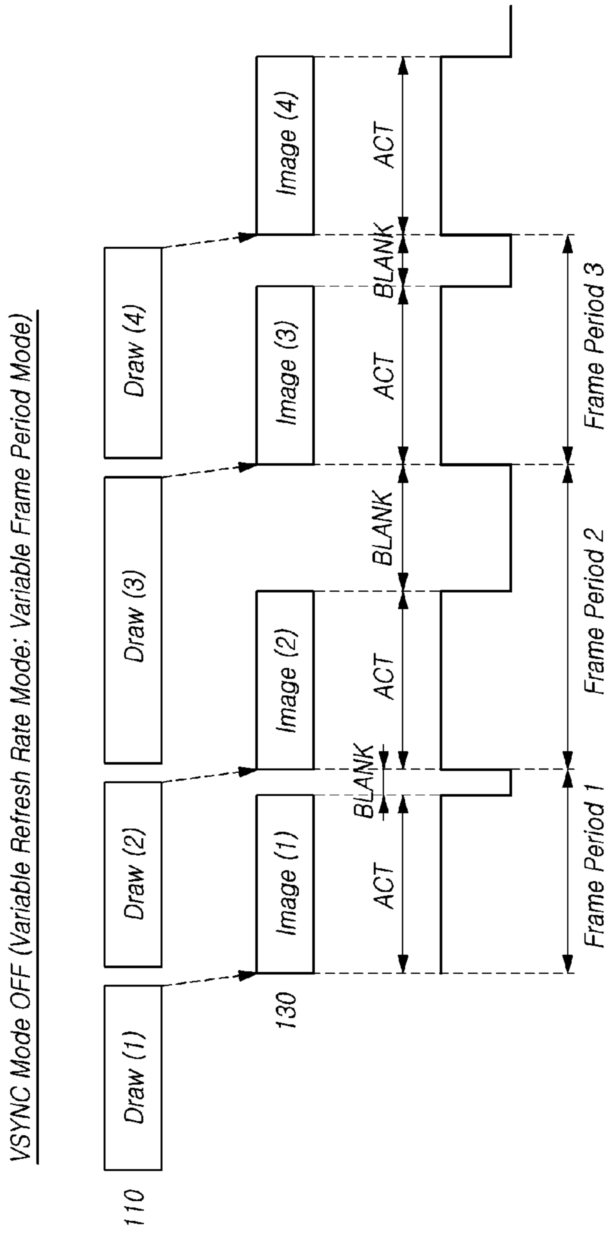
FIG. 9 is a diagram for explaining an aspect in which the display panel is driven in the variable refresh rate mode when the vertical synchronization mode (VSYNC Mode) is turned off.

FIG. 9 is a diagram for explaining an aspect in which the display panel 130 is driven in the variable refresh rate mode when the vertical synchronization mode is turned off. In this disclosure, refresh rate and frame rate may be used as an equivalent meaning.

Referring to FIG. 9, when the vertical synchronization mode is turned off, the main control device 110 processes the image of the corresponding frame, and the processed image is displayed on the display panel 130.

In the active period ACT, a data signal for displaying an image of a corresponding frame is input to the plurality of data lines DL of the display panel 130.

Each of the plurality of frames may include the active period ACT in which the image of the corresponding frame is input to the plurality of data lines DL, and the blank period BLANK, which is a period after the image of the corresponding frame is input to the plurality of data lines DL until the image of the next frame is input to the plurality of data lines DL.

While the vertical synchronization mode is turned off, each of a plurality of frames may have a frame period different from each other.

Each of the plurality of frames may have the same length of the active period ACT and different lengths of the blank period BLANK. That is, when the vertical synchronization mode is turned on, the length of the blank period BLANK of each of the plurality of frames may be the same. Meanwhile, when the vertical synchronization mode is turned off, the length of the blank period BLANK of each of the plurality of frames may be different from each other.

Referring to FIG. 9, the frame period of the first frame (Frame Period 1), the frame period of the second frame (Frame Period 2), and the frame period of the third frame (Frame Period 3) may all be different, however, the active period ACT of these frames may have the same length.

Accordingly, while the vertical synchronization mode is turned off, a screen tearing phenomenon may not occur in the display panel 130.

Figure 10:
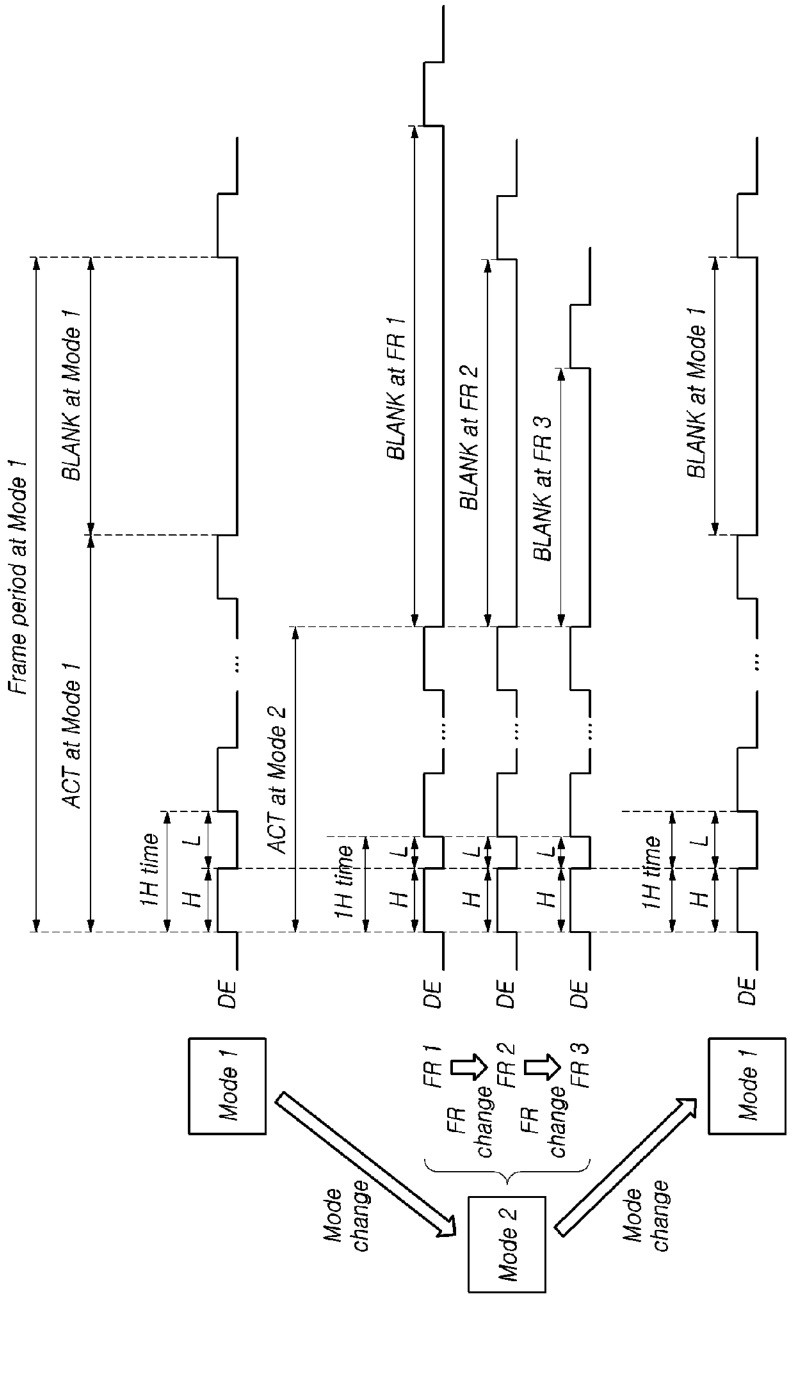
FIG. 10 illustrates frame periods in each mode based on a data enable signal DE in a first mode in which the display device is driven in the fixed refresh rate mode and the second mode in which the display device is driven in the variable refresh rate mode.

FIG. 10 illustrates frame periods in each mode based on a data enable signal DE in a first mode (Mode 1) in which the display device is driven in the fixed refresh rate mode and a second mode (Mode 2) in which the display device is driven in the variable refresh rate mode.

Referring to FIG. 10, the display device according to aspects of the present disclosure may be driven in either one of a first mode (Mode 1) and a second mode (Mode 2) under the control of the main control device.

The driving mode of the display device may vary depending on the type of image displayed by the display device. For example, when the display device displays an image such as a broadcast screen or a movie, there may be driven in the first mode (Mode 1). When the display device displays a game screen image, there may be driven in the second mode (Mode 2).

In the first mode (Mode 1), the display device may display an image at a preset refresh rate, and the preset refresh rate may be, for example, 120 Hz.

If the display device is switched from displaying a general image to displaying an image such as a game screen, the driving mode of the display device may be switched from the first mode (Mode 1) to the second mode (Mode 2).

In the second mode (Mode 2), the refresh rate of the display device for displaying an image may be variable. That is, the frame length may be different for each frame.

In the second mode (Mode 2), in each frame, the length of the active period ACT for displaying an image may be the same and only the length of the blank period BLANK may be different.

In order to adjust the length of the active period ACT differently for each frame, the length of one horizontal period (1H time) of the data enable signal DE is required to be changed for each frame. However, if the length of one horizontal period (1H time) of the data enable signal DE is different for each frame, the length of the period during which the data signal is applied to each subpixel may be different for each frame, so that the flicker phenomenon may be recognized so that the screen quality may deteriorate. Accordingly, the length of the period of each frame may be differently adjusted by adjusting the length of the blank period BLANK while maintaining the length of one horizontal period (1H time) of the data enable signal DE for each frame.

The above-mentioned one horizontal period (1H time) may correspond to a period in which the voltage level of the data enable signal DE is changed from a high level (H) to a low level (L) and then becomes a high level (H) again. A period in which the data enable signal DE is at a high level may correspond to a length of a period in which a data signal for displaying an image of a corresponding frame is applied to one sub-pixel.

In the display device according to the present disclosure, in the second mode (Mode 2), even if the length of the frame period varies for each frame, the display device may be driven in such a way that only the length of the blank period BLANK is changed and the length of the active period ACT is maintained constant.

For example, in the display device according to aspects of the present disclosure, when displaying an image at a refresh rate of 120 Hz, the length of the active period ACT may be set as the length of an active period ACT in the second mode. That is, even if the refresh rate is changed to 40 Hz, 60 Hz, or 120 Hz in the second mode (Mode 2), the length of the active period ACT may be constant. In this case, the refresh rate of 120 Hz may be the refresh rate with the highest level that the corresponding display device can implement in the second mode (Mode 2).

The highest level of refresh rate that the corresponding display device can implement in the second mode (Mode 2) may be also referred to as a reference frame rate FRref. A refresh rate (e.g., 40 Hz, 60 Hz, etc.) lower than the reference refresh rate FRref (e.g., 120 Hz) may be implemented by maintaining the length of the active period ACT and adjusting only the length of the blank period BLANK.

In the display device according to the aspects of the present disclosure, a color coordinate value or a level of a data voltage for displaying a black image may be set based on the reference refresh rate FRref in a stage before shipment.

A reference refresh rate FRref value in the second mode (Mode 2) may be set to be the same as the refresh rate in the first mode (Mode 1), but the two refresh rates may be designed differently.

For example, in the second mode (Mode 2), the reference refresh rate FRref may be 60 Hz or 120 Hz, but may be designed as a different value.

In the length of one horizontal period (1H time) in the second mode (Mode 2), compared with the length of one horizontal period (1H time) in the first mode (Mode 1), the length of the period in which the data enable signal DE is at the high level may be the same, and the length of the period in which the data enable signal DE is at the low level may be shorter.

In the first mode (Mode 1) and the second mode (Mode 2), the length of the period during which the voltage level of one horizontal period (1H time) is the high level is equal to each other may mean that a length of one horizontal clock (1 HCLK) is the same in the first mode (Mode 1) and the second mode (Mode 2).

In the second mode (Mode 2), the length of one horizontal period (1H time) may be constant as 3.1 μs for each frame when the reference refresh rate FRref is 144 Hz.

Referring to FIG. 10, when the second mode (Mode 2) is terminated, the display device according to the present disclosure is switched to the first mode (Mode 1), which is the fixed refresh rate mode.

Figure 11:
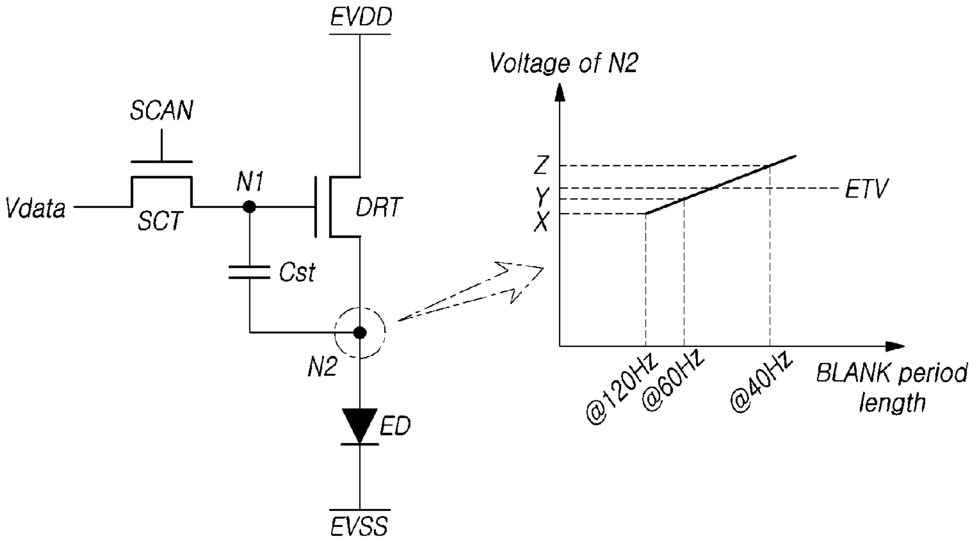
FIG. 11 is a diagram for explaining a relationship between a length of a blank period and a voltage difference between a first node and a second node of the driving transistor.

FIG. 11 is a diagram for explaining a relationship between a length of a blank period and a voltage difference Vgs between a first node and a second node of the driving transistor DRT.

During the blank period BLANK, a gate voltage of a turn-off voltage level is applied to the scan transistor SCT. However, due to the leakage current of the scan transistor SCT, the voltage of the first node N1 of the driving transistor DRT may gradually increase. In addition, as the voltage of the first node N1 of the driving transistor DRT gradually increases, the voltage of the second node N2 of the driving transistor DRT may also slightly increase during the blank period BLANK.

When the refresh rate is lowered in the variable refresh rate mode, the voltage of the second node N2 of the driving transistor DRT in a part of sub-pixels SP of the display panel may increase to such an extent that the light emitting device ED emits light.

Referring to FIG. 11, when the refresh rate is 120 Hz or 60 Hz in the second mode (Mode 2), the voltages X and Y of the second node N2 of the driving transistor DRT may be lower than an emission threshold voltage ETV. However, when the refresh rate is 40 Hz, the voltage Z of the second node N2 of the driving transistor DRT may be higher than the emission threshold voltage ETV In such a sub-pixel SP, there may occur a black imperfection phenomenon in which the light emitting device ED emits light during the blank period BLANK at a low refresh rate so as not to display complete black.

Figure 12:
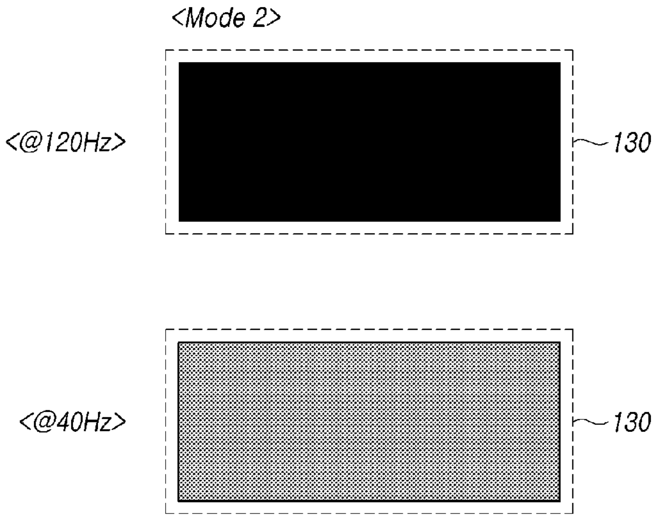
FIG. 12 is a diagram for exemplarily explaining a black imperfection phenomenon recognized by the display panel at a low refresh rate in the variable refresh rate mode.

FIG. 12 is a diagram for exemplarily explaining a black imperfection phenomenon recognized by the display panel at a low refresh rate in the variable refresh rate mode.

Referring to FIG. 12, in the case that an image is displayed at a high refresh rate, for example, a refresh rate of 120 Hz or higher in the second mode (Mode 2), a black imperfection phenomenon does not occur in the blank period BLANK.

However, if an image is displayed at a low refresh rate, for example, a refresh rate of 40 Hz or less in the second mode (Mode 2), a black imperfection phenomenon may occur in the blank period BLANK.

The black imperfection phenomenon may occur as a whole in the display panel 130 as shown in FIG. 12, but may also occur locally in a specific area of the display panel 130.

Accordingly, when the display panel 130 displays an image at a low refresh rate, there may occur a phenomenon in which the luminance of a low grayscale (e.g., 1 Gray to 40 Gray) image is recognized higher, or a flicker phenomenon in which the screen flickers.

In the case that the black imperfection phenomenon occurs locally in a specific area of the display panel 130, there may occur a phenomenon of the low grayscale clustering in a specific area or a phenomenon of the recognition of a difference in luminance in a low grayscale image.

Accordingly, there may occur a problem of poor display quality when a low grayscale image is displayed. Therefore, there is required a method for solving this problem.

Figure 13:
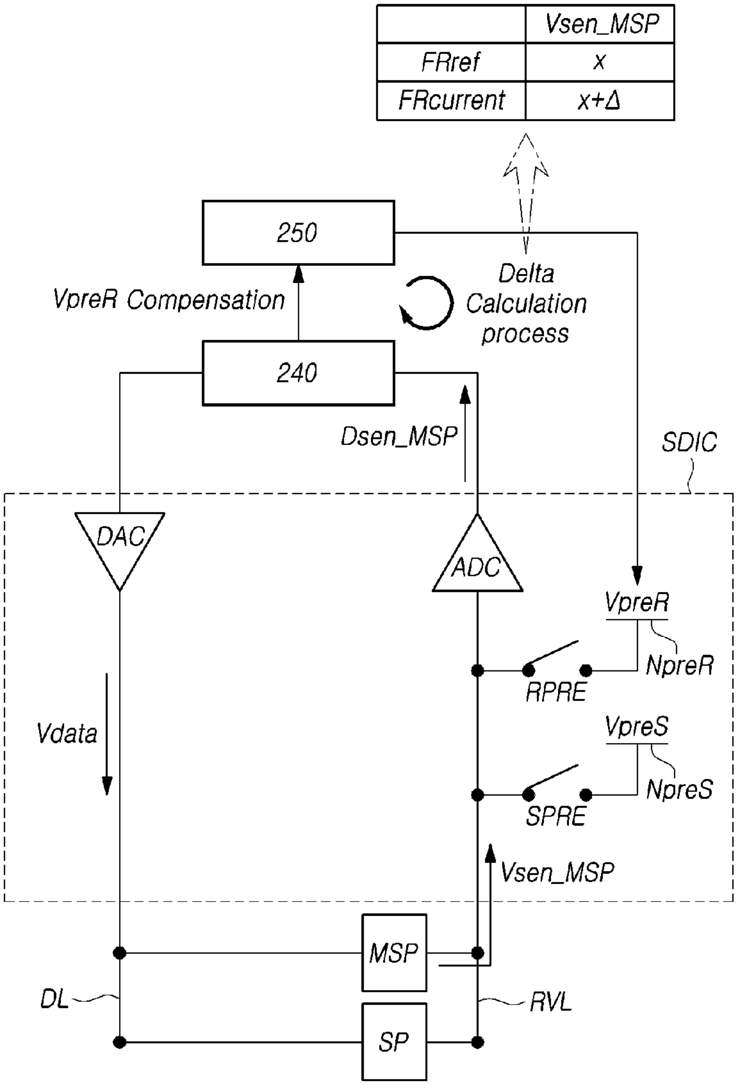
FIG. 13 is a diagram for describing a process of compensating a first initialization voltage in a display device according to aspects of the present disclosure.

FIG. 13 is a diagram for describing a process of compensating a first initialization voltage VpreR in a display device according to aspects of the present disclosure.

The display device according to aspects of the present disclosure may adjust the voltage level of the first initialization voltage VpreR by reflecting the length of the blank period BLANK. In the display device according to the aspects of the present disclosure, if the length of the blank period BLANK is increased, the voltage level of the first initialization voltage VpreR applied to the second node N2 of the driving transistor DRT may be adjusted to be increased. Accordingly, the voltage difference Vgs between the first node N1 and the second node N2 of the driving transistor DRT is reduced, thereby improving the black imperfection phenomenon.

There will be described in detail below an exemplary method of adjusting the voltage level of the first initialization voltage VpreR by reflecting the length of the blank period BLANK in the display device according to aspects of the present disclosure.

Referring to FIG. 13, a display device according to aspects of the present disclosure may include a monitoring sub-pixel MSP, and a reference voltage line RVL is electrically connected to the monitoring sub-pixel MSP.

The monitoring sub-pixel sensing voltage Vsen_MSP input from the monitoring sub-pixel RVL may be applied to the reference voltage line RVL.

The monitoring sub-pixel sensing voltage Vsen_MSP is a voltage in which the length of the blank period BLANK in the variable refresh rate mode is reflected.

The analog-to-digital converter ADC may receive the monitoring sub-pixel sensing voltage Vsen_MSP and output a digital value Dsen_MSP corresponding to the input monitoring sub-pixel sensing voltage Vsen_MSP to the timing controller 240.

The timing controller 240 may store a reference frame rate FRref and a monitoring sub-pixel sensing voltage value 'x' at a reference frame rate FRref.

The timing controller 240 may calculate a difference value 'Δ' between the monitoring sub-pixel sensing voltage value 'x+Δ' at the current frame rate FRcurrent and the monitoring sub-pixel sensing voltage value 'x' at the reference refresh rate FRref. This may be referred to as a "a Delta Calculation Process".

The timing controller 240 may calculate the difference value 'Δ' in the delta calculation process, and control the power management circuit 250 so as to correct the voltage value of the first initialization voltage VpreR by the calculated difference value 'Δ'.

For example, when the calculated difference value 'Δ' is positive, the timing controller 240 may control the power management circuit 250 to increase the voltage level of the first initialization voltage VpreR by the difference value 'Δ'. If the calculated difference value 'Δ' is negative, the timing controller 240 may control the power management circuit 250 to lower the voltage level of the first initialization voltage VpreR by the difference value 'Δ'.

The process of the timing controller 240 for controlling the power management circuit 250 to change the voltage level of the first initialization voltage VpreR based on the calculated difference value 'Δ' may be referred to as "a first initialization voltage VpreR compensation process".

These "delta calculation process" and "First initialization voltage VpreR compensation process" may be performed for each blank period BLANK in the variable refresh rate mode.

Accordingly, the voltage level of the first initialization voltage VpreR may be increased or decreased in real time by reflecting the refresh rate of the previous frame.

Specifically, if the length of the blank period BLANK of the previous frame is relatively long, the voltage level of the monitoring sub-pixel sensing voltage Vsen_MSP is high. Accordingly, the voltage level of the first initialization voltage VpreR also increases. If the length of the blank period BLANK of the previous frame is relatively short, the voltage level of the monitoring sub-pixel sensing voltage Vsen_MSP is low. Accordingly, the voltage level of the first initialization voltage VpreR also decreases.

The relationship between the length of the blank period BLANK and the monitoring sub-pixel sensing voltage Vsen_MSP will be described in detail with reference to FIG. 14.

Figure 14:
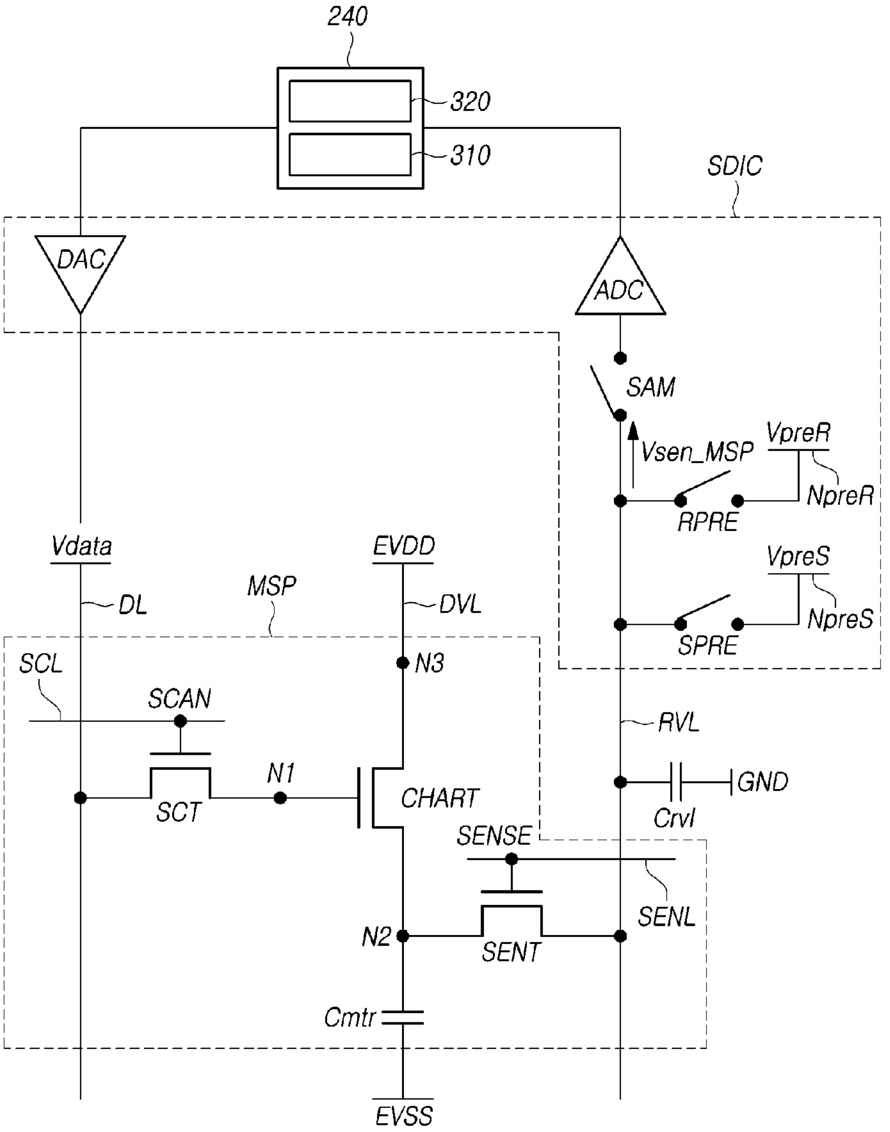
FIG. 14 is a diagram for describing a monitoring sub-pixel MSP and a monitoring sub-pixel sensing voltage in a display device according to aspects of the present disclosure.

FIG. 14 is a diagram for describing a monitoring sub-pixel MSP and a monitoring sub-pixel sensing voltage Vsen_MSP in a display device according to aspects of the present disclosure.

Referring to FIG. 14, the monitoring sub-pixel MSP may include a scan transistor SCT and a charging transistor CHART, a monitoring capacitor Cmtr, and a sensing transistor SENT.

The scan transistor SCT may be controlled by a scan signal SCAN, which is a type of gate signal, and may transfer a data voltage Vdata applied to the data line DL to the charging transistor CHART.

The charging transistor CHART of the monitoring sub-pixel MSP may correspond to the driving transistor DRT of the sub-pixel SP for displaying an image. However, the charging transistor CHART may be different from the driving transistor DRT in that it is not electrically connected to the light emitting device.

A first node N1 of the charging transistor CHART is electrically connected to the scan transistor SCT. A second node N2 of the charging transistor CHART is electrically connected to one end of the monitoring capacitor Cmtr. A high potential driving voltage EVDD is applied to a third node N3 of the charging transistor CHART. The first node N1 of the charging transistor CHART may be a gate node. The second node N2 of the charging transistor CHART may be either a source node or a drain node. The third node N3 of the charging transistor CHART may be the other one of a source node and a drain node.

One end of the monitoring capacitor Cmtr is electrically connected to the second node N2 of the charging transistor CHART. A base voltage EVSS is applied to the other end of the monitoring capacitor Cmtr.

The sensing transistor SENT may be controlled by a sense pulse SENSE, which is a type of gate signal, and switch an electrical connection between the second node N2 of the charging transistor CHART and the reference voltage line RVL.

The sensing transistor SENT may be turned on or turned off according to the sense pulse SENSE. If the sensing transistor SENT is turned on, the first initialization voltage VpreR is input to the second node N2 of the charging transistor CHART, or a voltage of one end of the monitoring capacitor Cmtr is input to the reference voltage line RVL.

The display device according to aspects of the present disclosure may monitor the voltage of one end of the monitoring capacitor Cmtr to change the voltage level of the first initialization voltage VpreR. Accordingly, the voltage at one end of the monitoring capacitor Cmtr input to the reference voltage line RVL may be also referred to as the monitoring sub-pixel sensing voltage Vsen_MSP.

While the display device is driven in the variable refresh rate mode, the data signal Vdata is input to the monitoring sub-pixel MSP.

In the active period ACT, the voltage level of the second node N2 of the charging transistor CHART is initialized to the first initialization voltage VpreR. Thereafter, a data signal Vdata of a voltage level for displaying a low grayscale image is applied to the first node N1 of the charging transistor CHART. Here, the low grayscale image may mean, for example, a black grayscale image.

In the blank period BLANK, the gate voltage applied to the first node N1 of the charging transistor CHART may increase due to the leakage current of the scan transistor SCT. Accordingly, the voltage of the first node N1 of the charging transistor CHART gradually increases during the blank period BLANK.

As the voltage of the first node N1 of the charging transistor CHART increases, the voltage of the second node N2 of the charging transistor CHART also increases from the first initialization voltage VpreR. The voltage of the second node N2 of the charging transistor CHART is applied to one end of the monitoring capacitor Cmtr.

In the variable refresh rate mode, if the length of the blank period BLANK is changed, the voltage increase amount of the second node N2 of the charging transistor CHART may be also changed. For example, if the length of the blank period BLANK is relatively long, the voltage of the second node N2 of the charging transistor CHART increases relatively more. Conversely, if the length of the blank period BLANK is relatively short, the voltage of the second node N2 of the charging transistor CHART increases relatively less.

In the blank period BLANK, a sense pulse SENSE of a turn-on voltage level is input to the sensing transistor SENT of the monitoring sub-pixel MSP. When the sense pulse SENSE of the turn-on voltage level is input to the sensing transistor SENT, the reference voltage line RVL and the second node N2 of the charging transistor CHART are electrically connected. The monitoring sub-pixel sensing voltage Vsen_MSP is applied to the reference voltage line RVL.

The monitoring sub-pixel sensing voltage Vsen_MSP applied to the reference voltage line RVL is a voltage in which the length of the blank period BLANK is reflected. In the same sense, the monitoring sub-pixel sensing voltage Vsen_MSP is a voltage in which the current refresh rate is reflected in real time in the variable refresh rate mode.

The analog-to-digital converter ADC may receive the monitoring sub-pixel sensing voltage Vsen_MSP, convert it into a digital value, and outputs the digital value to the timing controller 240.

The timing controller 240 may perform, using the lookup table LUT stored in the memory 310, the above-described "the delta calculation process" and "the first initialization voltage VpreR compensation process".

In the display device according to aspects of the present disclosure, in the variable refresh rate mode, when the length of the blank period BLANK gradually increases during consecutive frame periods, the voltage level of the first initialization voltage VpreR may be adjusted to increase in real time. Accordingly, the voltage difference Vgs between the gate node and the source node of the driving transistor included in the sub-pixel displaying the low grayscale image is reduced, and thus there may be solved the problem that the black imperfection phenomenon is recognized.

Meanwhile, in the display device according to the aspects of the present disclosure, as the voltage level of the first initialization voltage VpreR increases, a voltage difference Vgs between the gate node and the source node of the driving transistor included in the sub-pixel displaying the high grayscale image may also slightly decrease. However, in a sub-pixel displaying a high grayscale image, a decrease in the voltage difference Vgs has little effect on a viewer's visual perception, whereas the resolution of the black imperfection phenomenon in a low grayscale image due to the decrease in the voltage difference Vgs greatly affects the viewer's visual perception.

Accordingly, when the display device according to the aspects of the present disclosure operates in the variable refresh rate mode, it is particularly effective in improving display quality at a low refresh rate.

Figure 15:
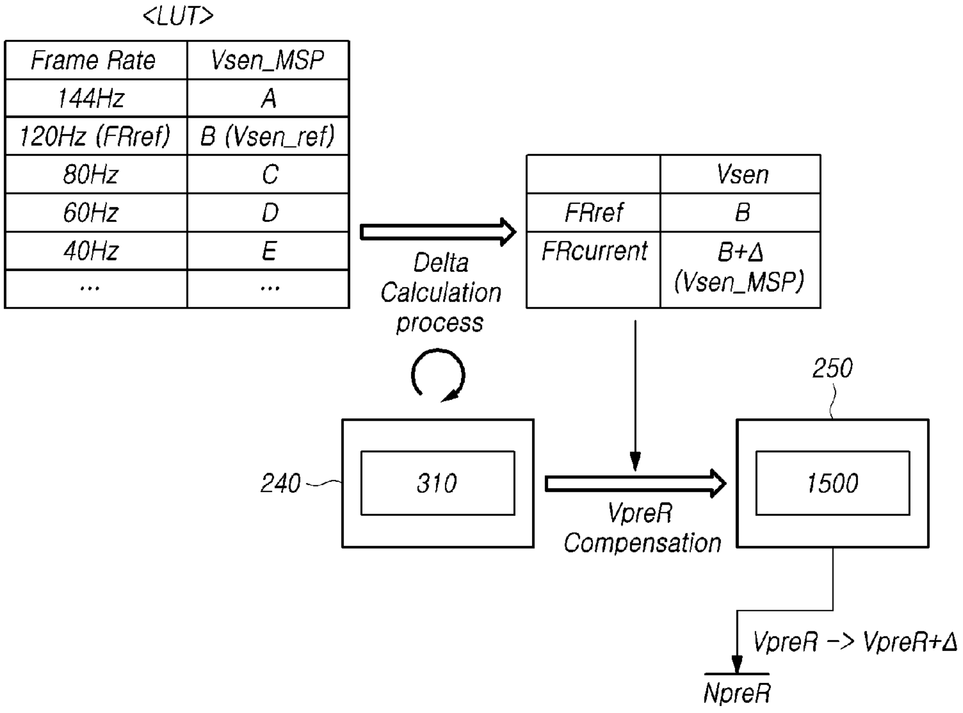
FIG. 15 is a diagram for describing a process in which a timing controller controls a power management circuit to change a voltage value of a first initialization voltage based on a reference refresh rate value and a reference sensing voltage value at the reference refresh rate value.

FIG. 15 is a diagram for describing a process in which a timing controller controls a power management circuit 250 to change a voltage value of a first initialization voltage VpreR based on a reference refresh rate value FRref and a reference sensing voltage value Vsen_ref at the reference refresh rate value.

Referring to FIG. 15, the timing controller 240 may include a memory 310, and the memory 310 stores a lookup table LUT.

The lookup table LUT stored in the memory 310 may store a frame rate value and a monitoring sub-pixel sensing voltage Vsen_MSP value of a monitoring subpixel at the corresponding refresh rate. The lookup table LUT may be pre-stored before shipment of the display device, or may be updated after shipment of the display device.

The lookup table LUT may store a reference refresh rate FRref value and a monitoring sub-pixel sensing voltage Vsen_MSP value when driving the display device at the reference refresh rate FRref. When driving at the reference refresh rate FRref, the value of the monitoring sub-pixel sensing voltage Vsen_MSP may be defined as the reference sensing voltage Vsen_ref.

In the display device according to the present disclosure, the analog-to-digital converter ADC may receive the monitoring sub-pixel sensing voltage Vsen_MSP, convert the input analog voltage into a digital value to output to the timing controller 240.

The timing controller 240 may check the value of the monitoring sub-pixel sensing voltage Vsen_MSP input to the analog-to-digital converter ADC based on the input digital value.

Meanwhile, the timing controller 240 may calculate a frame rate value corresponding to the monitoring sub-pixel sensing voltage Vsen_MSP with reference to the lookup table LUT stored in the memory 310.

Referring to FIG. 4 described above, an image displayed on the display panel 130 in a specific mode (e.g., a variable refresh rate mode) may be an image in which the frames per second FPS varies according to time. For example, the frames per second FPS at the current time point may increase, maintain a constant level, or decrease compared to the previous time point.

In the conventional display device, it is difficult to specify the frames per second FPS of an image displayed at the current time due to the characteristic that the frames per second FPS varies randomly with the time lapse. Accordingly, in the conventional display device, it is also difficult to improve the black imperfection phenomenon that may occur as frames per second FPS varies with time.

The display device according to aspects of the present disclosure may identify information on the frames per second FPS at the previous time point based on the monitoring sub-pixel sensing voltage Vsen_MSP sensed at the previous time point. For example, the timing controller 240 may receive a value corresponding to the monitoring sub-pixel sensing voltage Vsen_MSP for each blank period in the variable refresh rate mode. The timing controller 240 may calculate a value equal to or similar to the refresh rate at the current time point while the display device operates in the variable refresh rate mode.

Accordingly, the timing controller 240 may follow the frames per second FPS which changes in the specific mode described above. The timing controller 240 may set the level of the first initialization voltage VpreR based on the level of the monitoring sub-pixel sensing voltage Vsen_MSP. The timing controller 240 may control the power management circuit 250 to apply the first initialization voltage VpreR of a set level to the first initialization voltage supply node NpreR.

For example, the timing controller 240 may receive a value corresponding to the monitoring sub-pixel sensing voltage Vsen_MSP during the blank period of the first frame operating in the variable refresh rate mode.

The timing controller 240 may set the level of the first initialization voltage VpreR based on the level of the monitoring sub-pixel sensing voltage Vsen_MSP in the blank period (Example: VpreR+Δ).

The timing controller 240 may control the power management circuit 250 to apply the first initialization voltage VpreR+Δ having a set level.

The power management circuit 250 may input the first initialization voltage VpreR+Δ of the set voltage level to the first initialization voltage supply node NpreR. The first initialization voltage VpreR+Δ having the set voltage level may be input to the first initialization voltage supply node NpreR during the blank period of the corresponding frame and/or the active period of the next frame.

Hereinafter, it will be described in detail a process of calculating the first initialization voltage VpreR+Δ having a set voltage level.

The timing controller 240 may calculate a voltage difference between the monitoring sub-pixel sensing voltage Vsen_MSP value input to the analog-to-digital converter ADC and the reference sensing voltage Vsen_ref value as a difference value 'Δ'. The timing controller 240 may compare the monitoring sub-pixel sensing voltage Vsen_ref at the current refresh rate FRcurrent with the reference sensing voltage Vsen_ref at the reference refresh rate FRref to acquire a difference value 'Δ' between the two voltage values.

For example, in the lookup table LUT stored in the memory 310, when the refresh rate is 144 Hz, 120 Hz, 80 Hz, 60 Hz and 40 Hz, the monitoring sub-pixel sensing voltage Vsen_MSP may be stored as A, B, C, D and E, respectively. If the reference refresh rate FRref is 120 Hz, the reference sensing voltage Vsen_ref is B. The timing controller 310 calculates a difference value 'Δ' between a monitoring sub-pixel sensing voltage Vsen_MSP sensed during driving and a reference sensing voltage Vsen_ref value.

The above process in which the timing controller 240 calculates the difference value A may be referred to as a "delta calculation process".

Referring to FIG. 15, the power management circuit 250 may supply the first initialization voltage VpreR to the first initialization voltage supply node NpreR.

The power management circuit 250 may include a variable voltage output circuit 1500, and the power management circuit 250 may supply the voltage output from the variable voltage output circuit 1500 to the first initialization voltage supply node NpreR.

The variable voltage output circuit 1500 may include, for example, a resistor column (R-String) in which two or more resistors are connected in series, and a voltage input terminal to which a voltage is input at both ends of the resistor column. The power management circuit 250 may adjust the level of the voltage output from the variable voltage output circuit 1500 in a voltage division method using the resistor column.

The timing controller 240 controls the power management circuit 250 to apply the first initialization voltage VpreR+Δ corrected by the difference value 'Δ' to the first initialization voltage supply node NpreR. This may be referred to "a first initialization voltage compensation (VpreR compensation)".

The power management circuit 250 outputs the first initialization voltage VpreR+Δ of the compensated voltage level to the first initialization voltage supply node NpreR under the control of the timing controller 240.

Accordingly, the first initialization voltage VpreR+Δ having a voltage level compensated for by the difference value 'Δ' may be applied to the first initialization voltage supply node NpreR.

This difference value 'Δ' is a value reflecting the frame period length of the corresponding frame and the frame rate or refresh rate of the corresponding frame in the variable refresh rate mode.

The display device according to the present disclosure may supply the first initialization voltage VpreR reflecting the refresh rate or the frame rate of the corresponding frame to the first initialization voltage supply node NpreR in the variable refresh rate mode. Accordingly, the black imperfection phenomenon may be effectively prevented at a low refresh rate.

Figure 16:
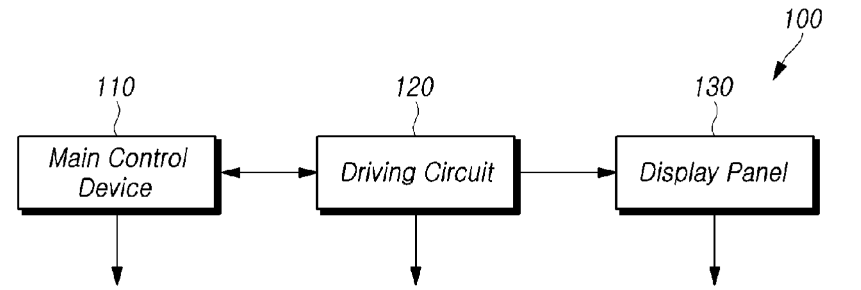
FIG. 16 schematically illustrates a difference between a case of displaying a general image and a case of displaying a gaming image in the display device according to the present disclosure.

FIG. 16 schematically illustrates a difference between a case of displaying a general image and a case of displaying a gaming image in the display device 100 according to the present disclosure.

Referring to FIG. 16, the main control device 110 may receive general image data or may receive gaming image data.

When the main control device 110 receives the general image data, the driving circuit 120 stores the image data of the corresponding frame in a frame buffer.

The driving circuit 120 may perform an image correction algorithm for modulating image data stored in the frame buffer. The algorithm may be, for example, an algorithm for preventing an afterimage from occurring in the display area as the display panel 130 is driven for a long time. For example, the driving circuit 120 may detect a logo area displaying the same image for a long time and perform an algorithm for lowering the luminance of the detected logo area.

The driving circuit 120 outputs various signals for image output to the display panel 130 based on the modulated image data. The display panel 130 displays an image at a preset refresh rate.

Meanwhile, the main control device 110 may receive gaming image data. Referring to FIG. 4 described above, gaming image data may refer to image data in which frames per second FPS varies with time. Image data for displaying a general image may mean image data having constant frames per second, unlike gaming image data.

When the main control device 110 receives the gaming image data, the driving circuit 120 may not store the gaming image data input to the main control device 110 in the frame memory.

The driving circuit 120 does not apply the aforementioned algorithm to the gaming image data, and accordingly, the gaming image to which the image modulation algorithm is not applied may be displayed on the display panel 130. Since the period in which the gaming image data is stored in the frame memory of the driving circuit 120 is omitted, the gaming screen of the next frame is displayed on the display panel 130 at a slightly earlier timing than the general image. Accordingly, the satisfaction of the user using the game content may be improved. Considering the characteristics of the gaming image in which the image displayed on the screen is rapidly switched, the advantages may outweigh the disadvantages.

Depending on the type of gaming image received by the main control device 110, the display panel 130 may display the image in the fixed refresh rate mode (Mode 1) or display the image in the variable refresh rate mode (Mode 2). For example, if the main control device 110 receives a first gaming image data, the display panel 130 may display the image in the fixed refresh rate mode (Mode 1). Alternatively, if the main control device 110 receives a second gaming image data, the display panel 130 may display the image in the variable refresh rate mode (Mode 2).

When the display panel 130 displays an image in the fixed refresh rate mode (Mode 1), the display panel 130 may display an image at a refresh rate of 60 Hz or display an image at a refresh rate of 120 Hz, for example. In some cases, the display panel 130 may display a gaming image at a refresh rate of 60 Hz, and then switch to a refresh rate of 120 Hz to display the image.

When the display panel 130 displays an image in the variable refresh rate mode (Mode 2), the display panel 130 may display the image at a variable from a low refresh rate to a high refresh rate. For example, the display panel 130 may display an image while varying from a low refresh rate of 40 Hz or less to a high refresh rate of 120 Hz or more.

The display device 100 according to the aspects of the present disclosure may display a complete black image when the second gaming image data is input in the variable refresh rate mode (Mode 2), so that there may provide a display device 100 with the improved display quality.

Figure 17:
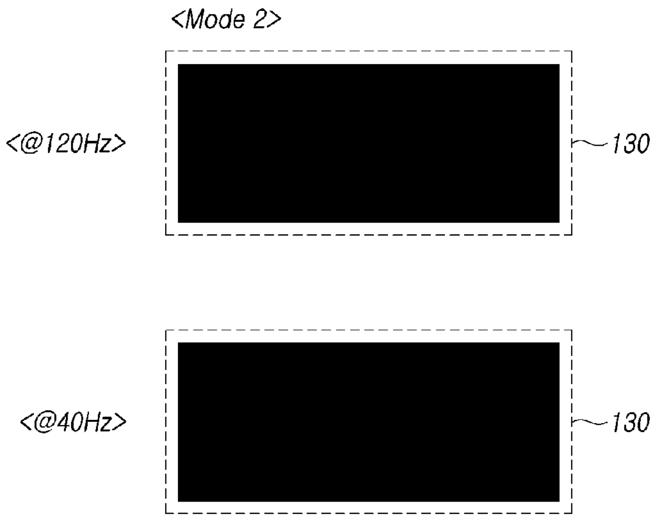
FIG. 17 exemplarily illustrates that a display device according to aspects of the present disclosure displays complete black in a variable refresh rate mode.

FIG. 17 exemplarily illustrates that a display device according to aspects of the present disclosure displays complete black in a variable refresh rate mode (Mode 2).

Referring to FIG. 17, the display device according to aspects of the present disclosure may display a completely black image on the display panel 130 regardless of the refresh rate in the variable refresh rate mode (Mode 2). Accordingly, it is possible to provide a display device with greatly improved display quality.

There will be provided a brief description of the aspects of the present disclosure as follows.

The display device 100 according to aspects of the present disclosure may include a sub-pixel SP including a light emitting device ED and a driving transistor DRT electrically connected to a first electrode of the light emitting device ED and configured to drive the light emitting device ED, and a reference voltage line RVL electrically connected to the sub-pixel SP and applying an initialization voltage VpreR to the first electrode of the light emitting device ED, wherein a voltage level of the initialization voltage VpreR is changed according to a length of a blank period BLANK.

The display device 100 according to aspects of the present disclosure may further include a display panel 130 including a display area AA in which the sub-pixels SP are disposed, and a non-display area NA around the display area AA. A monitoring sub-pixel MSP including a monitoring capacitor Cmtr and a charging transistor CHART electrically connected to one end of the monitoring capacitor Cmtr may be positioned in the non-display area NA, and the one end of the monitoring capacitor Cmtr may be electrically connected to the reference voltage line RVL.

In the display device 100 according to aspects of the present disclosure, the monitoring capacitor Cmtr may include the other end to which a base voltage EVSS is applied.

In the display device 100 according to aspects of the present disclosure, the monitoring sub-pixel MSP may further include a sensing transistor SENT configured to switch an electrical connection between the monitoring capacitor Cmrt and the reference voltage line RVL. In the variable refresh rate mode (Mode 2), a timing at which a sense pulse SENSE of a turn-on voltage level is applied may vary according to the length of the blank period BLANK.

The display device 100 according to aspects of the present disclosure may further include an analog-to-digital converter ADC for sensing a voltage of the reference voltage line RVL, and converting an sensed analog voltage Vsen_MSP into a digital value to output the digital value. A voltage at one end of the monitoring capacitor Cmtr input to the analog-to-digital converter ADC may vary according to the length of the blank period BLANK.

The display device 100 according to aspects of the present disclosure may further include a timing controller 240 for receiving the digital value output from the analog-to-digital converter ADC, and a power management circuit 250 for changing the voltage level of the initialization voltage VpreR under a control of the timing controller 240.

In the display device 100 according to aspects of the present disclosure, the timing controller 240 may include a memory 310 for storing a lookup table LUT including a reference refresh rate FRref value and a reference sensing voltage Vsen_ref value at the reference refresh rate FRref, wherein the timing controller 240 may control the power management circuit 250 to change the voltage level of the initialization voltage VpreR based on the reference sensing voltage Vsen_ref value.

In the display device 100 according to aspects of the present disclosure, the power management circuit 250 may further include a variable voltage output circuit 1500, and the initialization voltage VpreR may be output from the variable voltage output circuit 1500.

In the display device 100 according to aspects of the present disclosure, the variable voltage output circuit 1500 may include a resistor column (R-String) including two or more resistors. In addition, the power management circuit 1500 may apply a voltage divided by the resistor column (R-String) to an initialization voltage supply node NpreR.

In the display device 100 according to aspects of the present disclosure, during the display device is driven in the variable refresh rate mode (Mode 2), for a plurality of consecutive frames in the variable refresh rate mode (Mode 2), when the length of the blank period BLANK increases, the voltage level of the initialization voltage VpreR may increase, and when the length of the blank period BLANK decreases, the voltage level of the initialization voltage VpreR may decrease.

The display device 100 according to aspects of the present disclosure may further include a main control device 110 for controlling a driving mode of the display device 100 to be driven in either a variable refresh rate mode (Mode 2) or a fixed refresh rate mode (Mode 1).

In the display device 100 according to aspects of the present disclosure, in the variable refresh rate mode (Mode 2), a plurality of frames may have the same active period ACT length.

The display device 100 according to aspects of the present disclosure may further include an initialization voltage supply node NpreR electrically connected to the reference voltage line RVL through a switch RPRE and supplied with the initialization voltage VpreR, wherein, based on the length of the blank period BLANK, the voltage level of the initialization voltage VpreR applied to the initialization voltage supply node NpreR may vary during an active period ACT immediately after the blank period BLANK.

The above description has been presented to enable any person skilled in the art to make and use the technical idea of the present disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the present disclosure. The above description and the accompanying drawings provide an example of the technical idea of the present disclosure for illustrative purposes only. That is, the disclosed aspects are intended to illustrate the scope of the technical idea of the present disclosure. Thus, the scope of the present disclosure is not limited to the aspects shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A display device comprising:

a sub-pixel comprising a light emitting device and a driving transistor electrically connected to a first electrode of the light emitting device and configured to drive the light emitting device; and a reference voltage line electrically connected to the sub-pixel and applying an initialization voltage to the first electrode of the light emitting device, wherein a voltage level of the initialization voltage changes based on a positive correlation to a length of a blank period, wherein, after the display device is driven in a variable refresh rate mode, for a plurality of consecutive frames, when the length of the blank period increases, the voltage level of the initialization voltage increases, and when the length of the blank period decreases, the voltage level of the initialization voltage decreases.

2. The display device of claim 1, further comprising a display panel including a display area in which the sub-pixel is disposed, and a non-display area around the display area, wherein the non-display area includes a monitoring sub-pixel having a monitoring capacitor and a charging transistor electrically connected to one end of the monitoring capacitor which is electrically connected to the reference voltage line.

3. The display device of claim 2, wherein the monitoring capacitor includes another end to which a base voltage is applied.

4. The display device of claim 2, wherein the monitoring sub-pixel further includes a sensing transistor configured to switch an electrical connection between the monitoring capacitor and the reference voltage line according to a sense pulse, and wherein, in a variable refresh rate mode, a timing at which the sense pulse of a turn-on voltage level is applied varies according to the length of the blank period.

5. The display device of claim 4, further comprising an analog-to-digital converter configured to sense a voltage of the reference voltage line, convert the sensed voltage into a digital value, and output the digital value, wherein a voltage at the one end of a monitoring capacitor input to the analog-to-digital converter varies according to the length of the blank period.

6. The display device of claim 5, further comprising:

a timing controller configured to receive the digital value output from the analog-to-digital converter; and a power management circuit configured to change the voltage level of the initialization voltage under a control of the timing controller.

7. The display device of claim 6, wherein the timing controller includes a memory for storing a lookup table including a reference refresh rate value and a reference sensing voltage value at the reference refresh rate value, and wherein the timing controller is configured to control the power management circuit to change the voltage level of the initialization voltage based on the reference sensing voltage value.

8. The display device of claim 6, wherein the power management circuit further comprises a variable voltage output circuit configured to output the initialization voltage.

9. The display device of claim 8, wherein the variable voltage output circuit comprises a resistor column comprising two or more resistors, and wherein the power management circuit is configured to apply a voltage divided by the resistor column to an initialization voltage supply node.

10. The display device of claim 1, further comprising a main control device configured to control a driving mode of the display device to be driven in either a variable refresh rate mode or a fixed refresh rate mode.

11. The display device of claim 1, wherein, in a variable refresh rate mode, a plurality of frames have the same length of an active period.

12. The display device of claim 1, further comprising an initialization voltage supply node electrically connected to the reference voltage line through a switch and supplied with the initialization voltage, wherein, based on the length of the blank period, the voltage level of the initialization voltage applied to the initialization voltage supply node varies during an active period immediately after the blank period.

13. A display device comprising:

a display panel in which a sub-pixel for image display and a data line for providing a data voltage for image display to the sub-pixel are disposed, the sub-pixel comprising a light emitting device and a driving transistor for driving the light emitting device; and a reference voltage line electrically connected to the sub-pixel and applying an initialization voltage to a second node of the driving transistor, wherein the initialization voltage initializes a voltage of the second node of the driving transistor when the data voltage is input to the data line to cause the light emitting device to emit light, wherein the initialization voltage applied during a current frame increases as a length of a blank period of a previous frame increases in a variable refresh rate mode, and wherein, a first node of the driving transistor is a gate node, and the second node of the driving transistor is a source node or a drain node.

14. The display device of claim 13, wherein the display panel includes a display area in which the sub-pixel is disposed, and a non-display area around the display area, wherein the non-display area includes a monitoring sub-pixel including a monitoring capacitor and a charging transistor electrically connected to one end of the monitoring capacitor which is electrically connected to the reference voltage line.

* * * * *